United States Patent
Beth Halachmi et al.

(10) Patent No.: US 12,116,196 B2
(45) Date of Patent: Oct. 15, 2024

(54) MULTI-COMPONENTS CAPSULE FOR PRODUCING A COOLED EDIBLE PRODUCT

(71) Applicant: Solo Gelato Ltd., Hila (IL)

(72) Inventors: Barak Beth Halachmi, Hila (IL); Boaz Kwintner, Mitzpe Hila (IL)

(73) Assignee: SOLO GELATO LTD., Hila (IL)

( * ) Notice: Subject to any disclaimer, the term of this patent is extended or adjusted under 35 U.S.C. 154(b) by 697 days.

(21) Appl. No.: 17/290,674

(22) PCT Filed: Nov. 4, 2019

(86) PCT No.: PCT/IL2019/051202
§ 371 (c)(1),
(2) Date: Apr. 30, 2021

(87) PCT Pub. No.: WO2020/089919
PCT Pub. Date: May 7, 2020

(65) Prior Publication Data
US 2021/0403221 A1    Dec. 30, 2021

(30) Foreign Application Priority Data
Nov. 4, 2018   (IL) .......................................... 262757

(51) Int. Cl.
| | | |
|---|---|---|
| B65D 81/32 | (2006.01) | |
| A23G 9/08 | (2006.01) | |
| A23G 9/48 | (2006.01) | |
| A23G 9/52 | (2006.01) | |
| B65D 25/08 | (2006.01) | |
| B65D 85/78 | (2006.01) | |

(52) U.S. Cl.
CPC ............... *B65D 81/32* (2013.01); *A23G 9/08* (2013.01); *A23G 9/48* (2013.01); *A23G 9/52* (2013.01); *B65D 25/08* (2013.01); *B65D 85/78* (2013.01)

(58) Field of Classification Search
CPC ........ B65D 25/04; B65D 77/08; B65D 81/32; B65D 85/78; B65D 85/8055; B65D 85/8061; A23G 9/08; A23G 9/48; A23G 9/52; A47J 31/0673
USPC ..... 99/295, 323; 206/219–222; 426/77, 115, 426/433
See application file for complete search history.

(56) References Cited

U.S. PATENT DOCUMENTS

| | | | | |
|---|---|---|---|---|
| 6,338,569 B1 * | 1/2002 | McGill | ................... | A23G 9/045 366/147 |
| 2011/0033580 A1 * | 2/2011 | Biesheuvel | ......... | A47J 31/3695 426/77 |
| 2012/0251668 A1 * | 10/2012 | Wong | ................. | B65D 85/8061 426/77 |

(Continued)

FOREIGN PATENT DOCUMENTS

| | | |
|---|---|---|
| CN | 2892728 Y | 4/2007 |
| CN | 104411600 A | 3/2015 |
| WO | 2010/137960 A1 | 12/2010 |

(Continued)

*Primary Examiner* — Luan K Bui
(74) *Attorney, Agent, or Firm* — Vorys, Sater, Seymour and Pease LLP; Anthony P. Venturino; Maryellen Feehery Hank

(57) ABSTRACT

Provided herein are capsules for the preparation of cooled edible products from their ingredients, more specifically multi-components capsules that contain two or more ingredients for producing a cooled edible product.

12 Claims, 5 Drawing Sheets

(56) References Cited

U.S. PATENT DOCUMENTS

2017/0290460 A1* 10/2017 Karles .................. B65D 1/36
2018/0229924 A1   8/2018 Karles et al.

FOREIGN PATENT DOCUMENTS

| WO | 2013/121421 A1 | 8/2013 |
| WO | 2014/057094 A1 | 4/2014 |
| WO | 2015/022678 A1 | 2/2015 |
| WO | 2015/104610 A1 | 7/2015 |
| WO | 2018/008028 A1 | 1/2018 |

* cited by examiner

MULTI-COMPONENTS CAPSULE FOR PRODUCING A COOLED EDIBLE PRODUCT

TECHNOLOGICAL FIELD

The present disclosure concerns capsules for the preparation of cooled edible products from their ingredients, more specifically to multi-components capsules that contain two or more ingredients for producing a cooled edible product.

BACKGROUND ART

References considered to be relevant as background to the presently disclosed subject matter are listed below:
PCT patent application publication no. WO 2013/121421
PCT patent application publication no. WO 2015/022678
PCT patent application publication no. WO 2018/008028
Acknowledgement of the above references herein is not to be inferred as meaning that these are in any way relevant to the patentability of the presently disclosed subject matter.

BACKGROUND

Preparation of cooled food products, such as ice cream, gelato, soft-serve ice cream, etc., generally involves mixing edible ingredients for forming a mixture, adding gas/air into the mixture (sometimes a by-product of the mixing itself) in order to soften the texture of the mixture and cooling of the mixture.

At present, the majority of such cooled food products are produced in an industrial process. In this process, the cooled food product is produced in large volumes and then separated into packages of various sizes and shipped and sold as such to the end users. In cases where the cooled food product contains additive ingredients, e.g. chocolate chips or flakes, sprinkles, solid toppings and the like, these are typically produced separately and mixed or added to the cooled food product before or during packaging.

There are also known machines for domestic preparation of ice cream, allowing the user to prepare ice cream from a mixture of edible ingredients of his liking. In general, in such domestic machines, the user prepares the ingredients mixture and introduces the mixture into the machine which then cools the mix while mixing. Some machines have a built-in cooling arrangement while others only perform mixing, such that the user is required to transfer the mix, or the machine itself, into the freezer (or any other cooling chamber) in order to obtain the final product. Similar to the commercial processes, addition of various liquid or solid additives to the ice cream is carried out by adding these into or onto the mixture after processing.

GENERAL DESCRIPTION

The present disclosure concerns a capsule for utilization by an appliance that is configured for processing a food substance from ingredients contained in the capsule, into a cooled food product. The capsule of this disclosure contains two or more ingredients, which differ in their phase transition temperature. Thus, a sequence of introduction of the ingredients from the capsule into a processing chamber of the appliance results in a cooled food product having at least two distinct components, mixed one with the other, e.g. ice-cream and chocolate chips, that may be produced from a capsule containing a first substance for preparing ice-cream and a second substance for solidifying into chocolate chips during the processing by the appliance.

The appliance is typically sized and configured for preparing single serves (e.g. one serving) of the cooled food product. In other words, each capsule contains ingredients in an amount suitable for producing a single serving of cooled food product, such that a single capsule is utilized by the appliance for preparing a single serving (for example, for producing a volume of single scope or a cup of the product). A particular, non-limiting examples of cooled food products are ice-creams, sorbets, frozen-yogurts, cooled non-frozen whipped products (such as whipped yogurts), gelato, soft-serve ice cream, frozen drinks (such as coffee or alcoholic frozen drinks) and similar products, which are processed in the manner generally described in PCT patent publications WO 2012/121421 and WO 2015/022678. By one embodiment, the food ingredients in the capsule may be used as such for processing into the cooled food product. In other embodiments, the food ingredients may be mixed in a mixing chamber of the appliance with one or more other substances, such as the substance contained in a different capsule or a liquid provided from an external reservoir or directly by the user, e.g. water, milk, cream and the like. A particular embodiment of the appliance is one wherein the food ingredients drawn from the capsule are processed to prepare a single serving of the cooled product, for example, a single serve portion of ice-cream. Thus, in some embodiments, the capsule contains substances in an amount suitable for the preparation of a single serving of said finished cooled food product; namely, substantially the entire content of the capsule is utilized in order to prepare the single serving of cooled food product.

The capsule of this disclosure is based on the realization that differences in phase transition temperatures of different substances can be utilized in order to prepare a cooled food product that contains an edible continuous phase (e.g. ice cream), in which additive particles, flakes, swirls, or chunks are distributed (e.g. chocolate chips) in a single preparation process. The term phase transition temperature refers to a temperature in which the substance changes its phase from a liquid to a semi-solid, viscous or solid state in which said substance is to be dispensed. The phase-changing temperature is inherent to and depends on the nature of the ingredients in the substance and the desired texture of the final product. As may be appreciated, depending on the nature of the substance, the phase-changing temperature is not a fixed temperature but rather occurs over a range of temperatures with a more pronounced phase change with reduction of temperature. For example, a first substance which is a mixture of ingredients to produce ice-cream will undergo partial freezing or partial solidification when reaching its phase transition temperature, while a liquid chocolate substance will undergo substantially complete freezing or solidification upon reaching its phase transition temperature to form chocolate chips.

Thus, in one of its aspects, this disclosure provides a capsule that contains substances, typically two or more substances, for the preparation of a finished cooled food product by a food-processing appliance. The capsule typically contains at least one first substance that has a first phase transition temperature and at least one second substance that has a second phase transition temperature (e.g. higher or lower than the first phase transition temperature), such that the first and second substances undergo at least partial phase transition at said first and said second phase transition temperature, respectively during processing to produce the finished cooled food product by the appliance. In other words, once the capsule is introduced into the appliance, the first and second substances are introduced from the capsule into a cooled processing chamber of the appliance in a desired sequence (typically one after the other) to prepare the finished product.

For example, a first substance containing ingredients for the preparation of ice-cream is first introduced from the capsule into the processing chamber of the appliance to be processed into ice-cream in a first temperature (or first temperature profile), followed by introduction of the second substance—for example a liquid mixture for forming chocolate chips upon solidification once exposed to a second temperature (or second temperature profile). Thus, once the second substance is introduced into the processing chamber and reaches said second temperature, chocolate chips will be formed in situ by solidification of the second substance and distributed within the ice-cream.

By an embodiment, one of the first and second substances is selected to form a cooled edible continuous phase of the cooled food product and the other of the first and second substances being selected to form a semi-solid, viscous or solid additive distributed in the continuous phase.

The capsule can be made of a hard but formable material, e.g. plastic or metal (such as aluminum); alternatively, the capsule can be made of a soft material, such as paper or cardboard. The capsule typically comprises a capsule body having a bottom wall, a circumferential side wall extending upwardly from the bottom wall and defining a capsule opening, and a pierceable or rupturable or removable lid that seals the capsule opening. An axis is defined between the bottom wall and the lid.

For the sake of convenience, reference will be made in the following text to an upward-downward directionality along the capsule's axis. Direction towards the bottom wall of the capsule will be regarded as "downward" or "bottom" and direction towards the lid of the capsule will be regarded as "upward" or "top". This, as may be appreciated, does not necessarily have any functional significance and in actual use the capsule may have a different orientation, e.g. it may be reversed, laterally rotated, etc.

Further, reference will be made to a "first" and "second" substance or compartment. It is to be understood that, unless otherwise specified, the terms are not meant to indicate any specific sequence or hierarchy of operation.

In order to permit access to the capsules interior, the lid is configured for piercing or rupturing by a piercing element of the food processing appliance. Thus, in use, once a capsule is introduced into the appliance, a piercing element pierces the lid and establishes fluid communication between the capsule's interior and a processing chamber (e.g. mixing and cooling chamber) of the appliance. The content of the capsule is then transferred from the capsule into the processing chamber, for example by vacuum, in a desired sequence. Suitable mechanisms by which the content of the capsule is drawn from the capsule's interior and transferred to the processing chamber of the appliance are described, for example, in PCT patent publication no. WO 2018/008028. The sequence of introduction may be determined by the type of finished product to be produced (e.g. an ice-cream or a sorbet) and/or by the type of substances used to prepare the finished product.

Unique features of the capsule are to be found in the combination of two or more substances within a single capsule used for preparing the finished product. The capsule may have various geometries and arrangement to provide internal division of the capsule's internal space, such that compartments are formed to accommodate each of the substances and permit selective access to the specific compartment according to the process step or recipe for preparing the finished product.

For this purpose, the capsule body, by one embodiment, comprises at least one first compartment accommodating the first substance and at least one second compartment accommodating the second substance. The compartments are typically, albeit not exclusively, integrally formed one with the other and/or with the capsule's body. Namely, the compartments may be formed by various arrangements of dividing walls, that may be integrally formed with the capsule's body, thus dividing the capsule's internal space to distinct compartments.

By an embodiment of this disclosure, the first compartment is positioned on top of the second compartment along the capsule's axis; i.e. the compartments may be vertically stacked along the axis. In such an arrangement, a pierceable or rupturable sheet is disposed between the first and second compartments to separate therebetween. According to an embodiment, the first compartment is defined between the lid of the capsule and the pierceable or rupturable sheet, while the second compartment is defined between the pierceable or rupturable sheet and the bottom wall of the capsule, such that the pierceable or rupturable sheet functions as a divider that divides the internal space of the capsule into the two compartments. In use, the piercing element pierces the lid to gain access to the first compartment. After the content of the first compartment has been transferred to the processing chamber of the appliance, the piercing element pierces the pierceable or rupturable sheet, thus gaining access to the second compartment and the second substance contained therein.

By another embodiment, the first and second compartments may be arranged side-by-side within the capsule body. In such an arrangement, at least one axially-extending internal divider, extending from the bottom wall to the lid, may divide the internal space of the capsule into two or more compartments arranged side-by-side. In use, the piercing element may be selectively positioned to pierce or rupture the lid at various locations in order to selectively gain access to a desired compartment in a desired sequence of operation.

In another embodiment, the first and second compartments may be concentrically arranged about the axis; for example a closed-loop axially-extending internal wall may divide the internal space of the capsule into two concentric compartments. A similar arrangement may be obtained by fixing an internal cup, having a smaller internal volume than that of the capsule, to the capsule's bottom wall, thus forming two concentric internal compartments within the capsule's internal space.

The separation of the first and second substances within the capsule may also be formed as a result of the substance's physical properties, rather than by separation by physical means (such as divider walls). In an embodiment, the substances may differ in a physical and/or chemical property that induces phase separation between the substances, e.g. their viscosity, density, hydrophobic/hydrophilic character, etc., such that phase separation is obtained within the capsule. In other words, the substances may differ in their properties such that distinct layers are formed with the capsule, for example a top layer comprising substantially the first substance and a bottom layer comprising substantially the second substance. By such differences, separation between the substances is formed, within the need for physical divider walls.

It is noted that although the capsule disclosed herein is described, for the sake of convenience, to comprise first and second substances, it should be understood that the same principles may apply to capsules containing more than two substances, e.g. 2, 3, 4, 5 or even more substances, at least two of which differing in their freezing temperatures.

The capsule may, by an embodiment, carry data such that once acquired by the appliance. The data carried by the capsule is read by a data reader associated with the appliance, causing the controller to operate the appliance in a processing sequence suitable for the specific capsule and the desired final edible product.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1A:
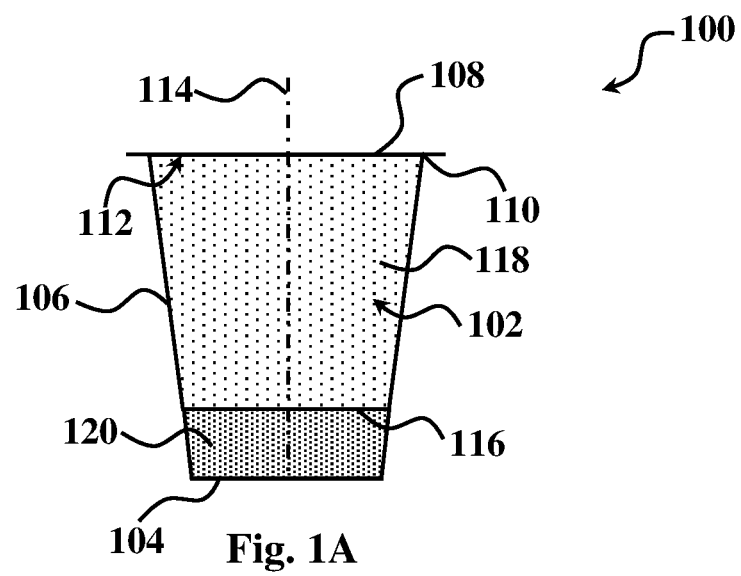
FIGS. 1A-1C are longitudinal cross-sections through schematic representations of a capsule according to an embodiment of this disclosure in which the two compartments are vertically stacked along the axis of the capsule.
Figure 1B:
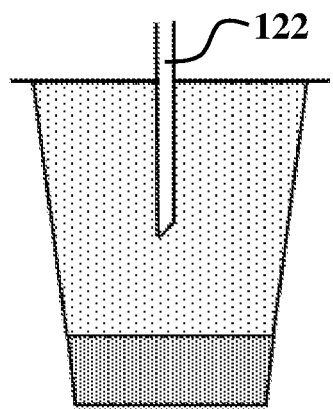
Figure 1C:
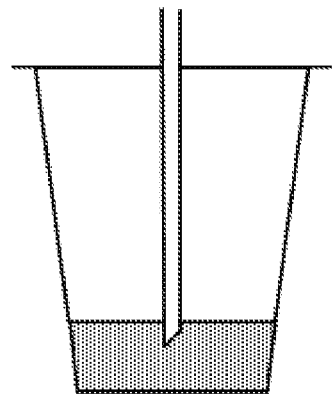

FIGS. 1A-1C show a capsule according to this disclosure, typically for use in an appliance for the preparation of a single serving of a cooled edible product, such as ice-cream. In the embodiment shown in FIG. 1A, capsule 100 comprises a capsule body 102 having an interior space 102, that is defined between bottom wall 104, circumferential side wall 106 and pierceable or rupturable lid 108. The top edge 110 of the circumferential wall 106 also defines an opening 112 through which the capsule may be filled with desired substances at the producer's facility and then closed by the lid 108 (although it is also possible that filling of the capsule with the substances will alternatively be carried out via an opening in bottom wall 104 or side wall 106, that, after filling, is sealed or plugged). An axis 114 is defined between the bottom wall and the lid.

Although the exemplified capsule has a frustoconical shape, it is to be understood that the capsule may have any suitable form or geometry, e.g. cylindrical, cubic, trapezoid, pyramidal, tetrahedron or any other shape.

In the capsule of FIG. 1A, divider wall 116 separates between a first (top) compartment 118 that contains a first substance, and a second (bottom) compartment 120 that contains a second substance; the first and second substances differ in their freezing temperatures. In this embodiment, the divider wall 116 is constituted by a pierceable or rupturable sheet, that is typical impermeable to the first and second substances (for example an aluminum foil).

In use, as schematically demonstrated in FIG. 1B, once the capsule is introduced into the appliance, a hollow piercing element 122 of the appliance (not shown) pierces the lid 108, to gain access to the first compartment 118. The first substance is then transferred from the first compartment 118 to a processing chamber of the appliance via the piercing element 122, e.g. by vacuum, and undergoes a first stage or a first set of steps within the processing chamber. Once the processing has reached a stage in which the introduction of the second substance is desired or required, the piercing element 122 is axially (vertically) advanced towards the divider wall 116 in order to pierce it, as seen in FIG. 1C, thus gaining access to the second substance.

Figure 2A:
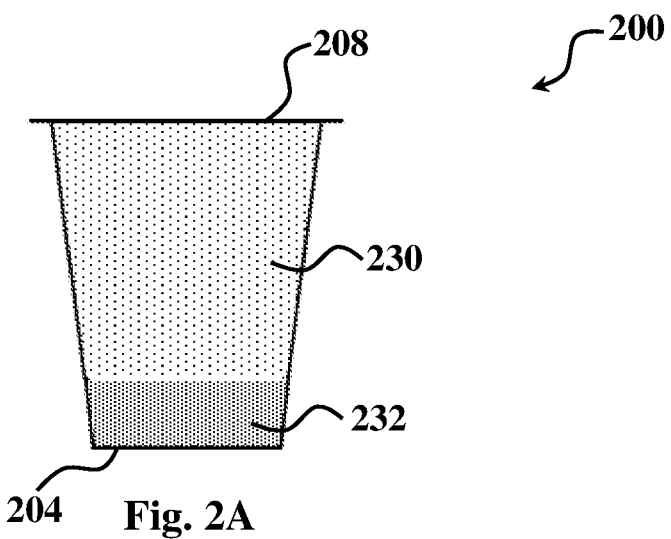
FIGS. 2A-2C are longitudinal cross-sections through schematic representations of a capsule according to another embodiment of this disclosure, in which the two substances form distinct layers within the capsule due to differences in density and/or viscosity.
Figure 2B:
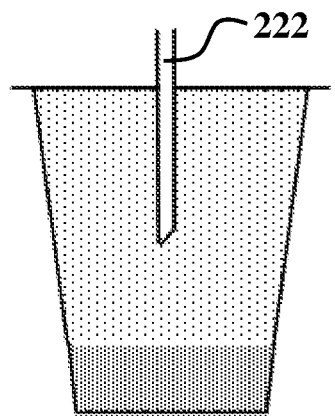
Figure 2C:
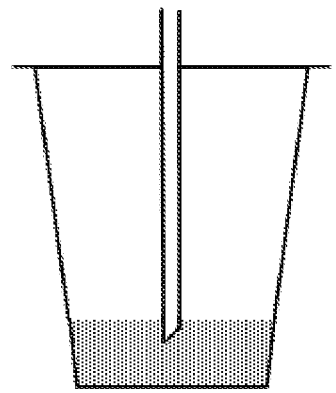

A similar principle of utilization is shown in FIGS. 2A-2C. In these figures, like elements were given like numbers, however shifted by 100 for ease of convenience. For example, the bottom wall 204 in FIG. 2A is similar in structure and/or function to bottom wall 104 in FIG. 1A. The reader is referred to the description of FIGS. 1A-1C for fully understanding the function of each element.

In the capsule 200, shown in FIG. 2A, first substance has at least one chemical and/or physical property (e.g. density, viscosity, etc.) that is different from the second substance, such that this difference in properties results in phase separation into a top layer 230 comprising substantially the first substance and a bottom layer 232 comprising substantially the second substance. In this manner "virtual" compartments are formed, without the need to separate between the substances by a mechanical of physical means. In use, the vertical position of the hollow piercing element 222 will determine which substance is extracted from the capsule; namely in the sequence shown in FIGS. 2B-2C, the first substance 230 is first transfer from the capsule to the processing chamber of the appliance, followed by transferal of the second substance 232. However, it is also possible that the second substance will be transferred first by vertically positioning the hollow piercing element 222 closer to the bottom wall 204 to extract the second substance 232, and only afterwards transfer the first substance 230 to the processing chamber.

Figure 3A:
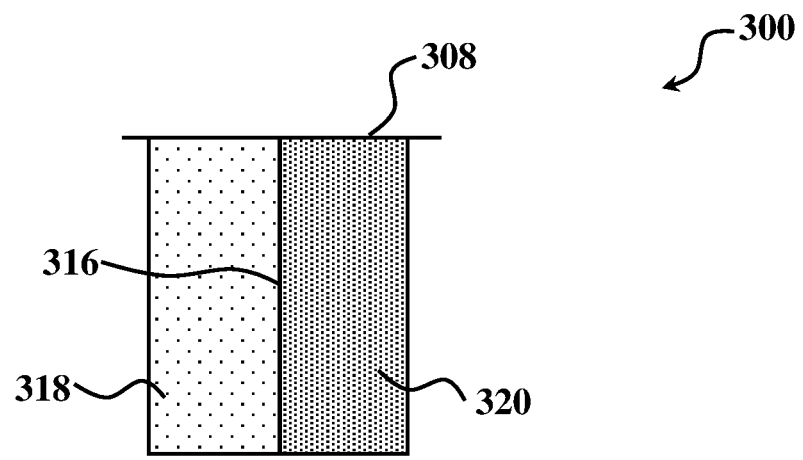
FIGS. 3A-3C are longitudinal cross-sections through schematic representations of a capsule according to another embodiment of this disclosure, in which the two compartments are arranged side-by-side.
Figure 3B:
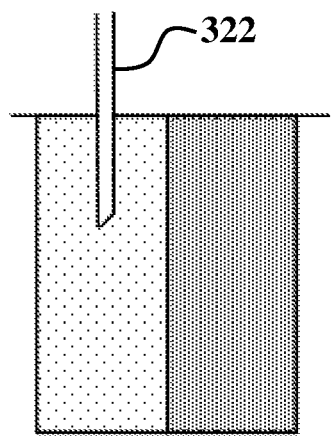
Figure 3C:
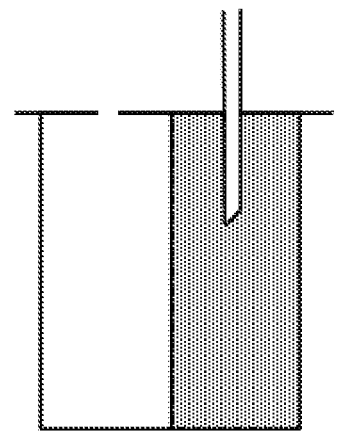

In the capsule of FIGS. 3A-3C, the first and second compartments are arranged side-by-side. Vertical divider wall 316 divides the internal space of the capsule into two, side-by-side compartments 318 and 320, that contain the first and second substances, respectively. In use, selective positioning of the hollow piercing element 322 can be used to draw the desired substance from the capsule.

Figure 4A:
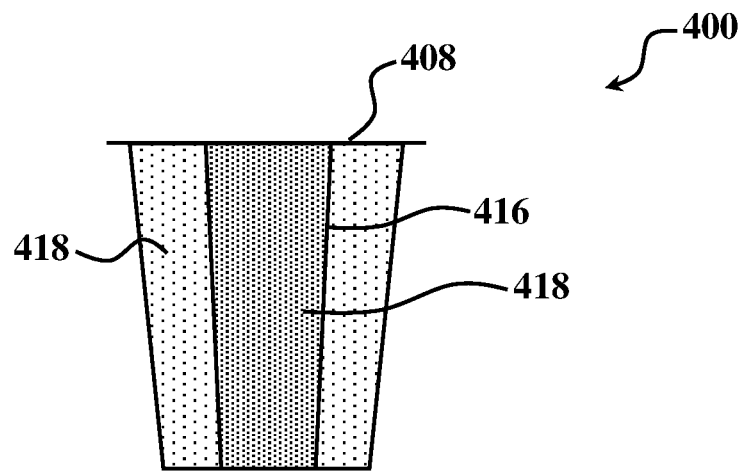
FIGS. 4A-4C are longitudinal cross-sections through schematic representations of a capsule according to another embodiment of this disclosure in which the two compartments are concentrically arranged about the axis of the capsule.
Figure 4B:
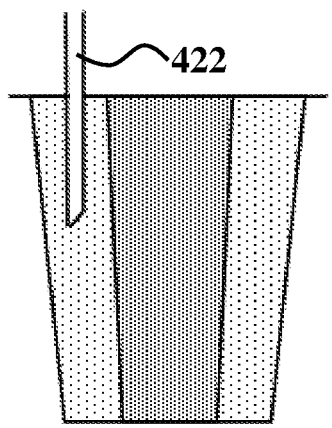
Figure 4C:
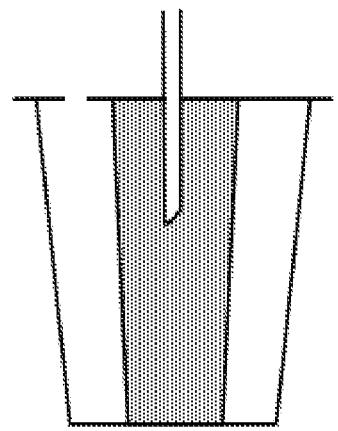
Figure 5A:
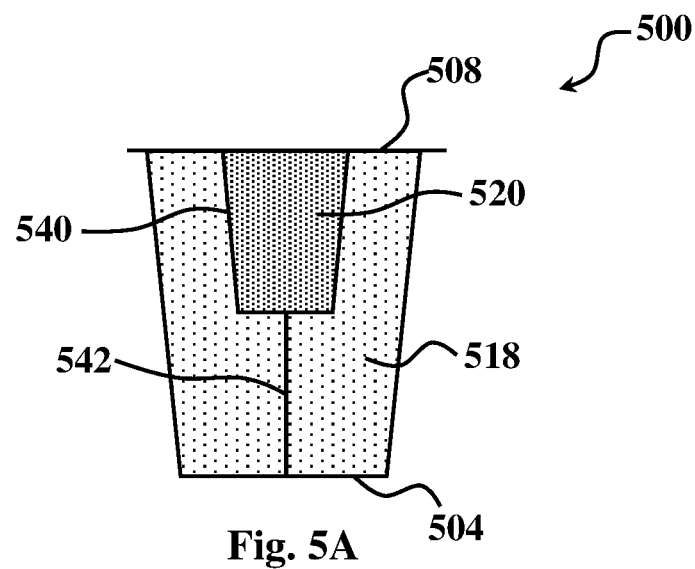
FIGS. 5A-5C are longitudinal cross-sections through schematic representations of a capsule according to another embodiment of this disclosure in which the two compartments are concentrically arranged about the axis of the capsule.
Figure 5B:
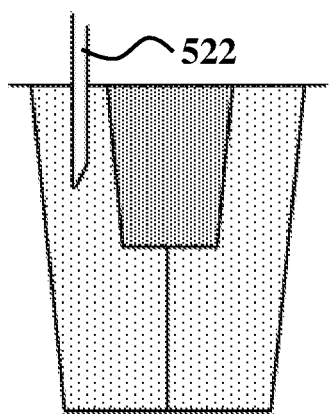
Figure 5C:
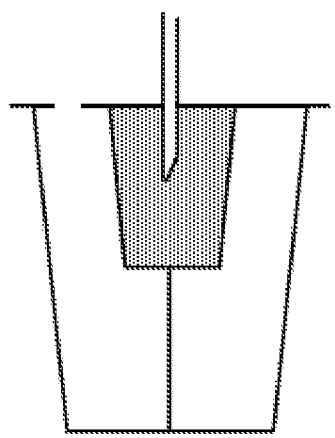

In a similar manner, closed-loop wall 416 formed in capsule 400 in FIGS. 4A-4C divides the internal space of the capsule to two concentric compartments 418 and 420, each containing a different substance. Such concentric arrangement may also be obtained by the configuration of FIGS. 5A-5C, in which the inner compartment 540 is constituted by a cup-shaped element 540, that is held in position by a linking stem 542 extending from the bottom wall 504 and supports the cup-shaped element 540. Cup shaped element 540 forms a compartment containing one of the substances while the remainder of the internal volume of the capsule forms the other compartment 518.

The invention claimed is:

1. A capsule containing substances for the preparation of a cooled food product by a food-processing appliance, the capsule containing at least one first substance having a first phase transition temperature and at least one second substance having a second phase transition temperature, the capsule being configured to permit introduction of the first and second substances in a sequence one after the other into a processing chamber of the food processing appliance, the capsule having an internal space divided into at least one first compartment accommodating the first substance and at least one second compartment accommodating said second substance, the first and second compartments being configured to permit selective access thereto according to the process step or recipe for preparing the cooled food product, the first and second substances being selected to form, at said respective first and second transition temperatures, at least two distinct components in the cooled food product, one of the first and second substances being selected to form a cooled edible continuous phase of the food product and the other of the first and second substances being a liquid that is selected to form a semi-solid, viscous or solid additive phase distributed in the continuous phase;

such that, in use by the food processing appliance configured for utilizing the capsule, the first and second substances are introduced from the capsule into a cooled processing chamber of the appliance one after the other, such that the first and second substances undergo at least partial phase transition at said first and said second phase transition temperature, respectively, during processing to produce said cooled food product to obtain a cooled edible product having two distinct phases.

2. The capsule of claim 1, comprising a capsule body having a bottom wall, a circumferential side wall extending upwardly from the bottom wall and defining a capsule opening, and a pierceable or rupturable or removable lid, sealing the capsule opening, and an axis defined between the bottom wall and the lid.

3. The capsule of claim 2, wherein the lid is configured for piercing or rupturing by a piercing element of the food processing appliance.

4. The capsule of claim 1, wherein the first and second compartments are integrally formed one with the other.

5. The capsule of claim 1, wherein the first compartment is positioned on top of the second compartment along the axis.

6. The capsule of claim 5, wherein a pierceable or rupturable sheet separates between the first and second compartments.

7. The capsule of claim 1, wherein the first and second compartments are arranged side-by-side within the capsule body.

8. The capsule of claim 1, wherein the first and second compartments are concentrically arranged about the axis.

9. The capsule of claim 1, wherein the phase transition temperature of the first substance is higher than the phase transition temperature of the second substance.

10. The capsule of claim 1, wherein the phase transition temperature of the second substance is higher than the phase transition temperature of the first substance.

11. The capsule of claim 1, wherein the capsule contains substances in an amount suitable for the preparation of a single serving of said cooled food product.

12. The capsule of claim 1, wherein the first and second substances are in liquid form at a temperature higher than said first and second phase transition temperatures.

\* \* \* \* \*